US008859676B2

(12) United States Patent
Morikami et al.

(10) Patent No.: US 8,859,676 B2
(45) Date of Patent: Oct. 14, 2014

(54) AQUEOUS POLYURETHANE RESIN DISPERSION AND PROCESS FOR PREPARING THE SAME

(75) Inventors: Atsushi Morikami, Ube (JP); Masahiro Naiki, Ube (JP); Fumio Adachi, Ube (JP); Manabu Takahashi, Ube (JP)

(73) Assignee: UBE Industries, Ltd., Ube-Shi (JP)

( * ) Notice: Subject to any disclaimer, the term of this patent is extended or adjusted under 35 U.S.C. 154(b) by 0 days.

(21) Appl. No.: 13/203,454

(22) PCT Filed: Feb. 23, 2010

(86) PCT No.: PCT/JP2010/052757
§ 371 (c)(1),
(2), (4) Date: Aug. 25, 2011

(87) PCT Pub. No.: WO2010/098316
PCT Pub. Date: Sep. 2, 2010

(65) Prior Publication Data
US 2011/0313101 A1    Dec. 22, 2011

(30) Foreign Application Priority Data
Feb. 26, 2009  (JP) ................................. 2009-043483

(51) Int. Cl.
C08G 18/08    (2006.01)
C08K 3/20    (2006.01)
C08L 75/00    (2006.01)
C08G 18/75    (2006.01)
C09D 5/02    (2006.01)
C08G 18/12    (2006.01)
C08G 18/66    (2006.01)
C09D 175/04    (2006.01)
C08G 18/44    (2006.01)

(52) U.S. Cl.
CPC ............... C09D 5/02 (2013.01); C08G 18/758 (2013.01); C09D 5/024 (2013.01); C08G 18/12 (2013.01); C08G 18/6659 (2013.01); C09D 175/04 (2013.01); C08G 18/0823 (2013.01); C08G 18/44 (2013.01)
USPC ........... 524/591; 524/590; 524/837; 524/838; 524/839; 524/871; 524/874; 524/588; 528/59; 528/61; 528/76; 528/78; 528/85

(58) Field of Classification Search
USPC ......... 524/837, 838, 839, 590, 591, 871, 874, 524/588; 528/59, 61, 76, 78, 85
See application file for complete search history.

(56) References Cited

U.S. PATENT DOCUMENTS

| 4,024,113 | A | 5/1977 | Ammons |
| 4,103,070 | A | 7/1978 | Ammons |
| 4,895,894 | A | 1/1990 | Ruetman et al. |
| 4,956,438 | A | 9/1990 | Ruetman et al. |
| 5,043,381 | A | 8/1991 | Coogan et al. |
| 5,124,424 | A | 6/1992 | Endo et al. |
| 5,141,987 | A * | 8/1992 | Nachtkamp et al. ........... 524/591 |
| 5,143,997 | A | 9/1992 | Endo et al. |
| 5,169,995 | A | 12/1992 | Crooker et al. |
| 5,693,703 | A | 12/1997 | Hart |
| 5,738,912 | A * | 4/1998 | Konig et al. ................... 427/389 |
| 5,859,122 | A | 1/1999 | Umeya |
| 6,096,805 | A | 8/2000 | Lange et al. |
| 6,433,072 | B1 * | 8/2002 | Gobel et al. ................... 524/591 |
| 7,511,082 | B2 | 3/2009 | Nakamura et al. |
| 7,728,076 | B2 | 6/2010 | Wamprecht et al. |
| 2002/0156145 | A1 | 10/2002 | Van Den Berg et al. |
| 2004/0077779 | A1 | 4/2004 | Schafheutle et al. |
| 2004/0259970 | A1 | 12/2004 | Lockhart et al. |
| 2005/0003102 | A1 | 1/2005 | Lockhart et al. |
| 2006/0240264 | A1 | 10/2006 | Gertzmann et al. |
| 2007/0083002 | A1 | 4/2007 | Schafheutle et al. |
| 2007/0155933 | A1 | 7/2007 | Watanabe et al. |

(Continued)

FOREIGN PATENT DOCUMENTS

| EP | 0 616 007 A1 | 9/1994 |
| EP | 0 665 563 A1 | 8/1995 |
| EP | 2 281 848 A1 | 2/2011 |
| GB | 2 426 771 A | 11/2006 |
| JP | 52-132096 A | 11/1977 |
| JP | 1-104612 A | 4/1989 |

(Continued)

OTHER PUBLICATIONS

International Preliminary Report on Patentability and Written Opinion of the International Searching Authority (Forms PCT/IB/338, PCT/IB/373 and PCT/ISA/237), dated Sep. 22, 2011, for Application No. PCT/JP2010/052757.

International Preliminary Report on Patentability and Written Opinion of the International Searching Authority (Forms PCT/IB/338, PCT/IB/373 and PCT/ISA/237), dated Sep. 22, 2011, for Application No. PCT/JP2010/052758.

(Continued)

Primary Examiner — Michael L Leonard
(74) Attorney, Agent, or Firm — Birch, Stewart, Kolasch & Birch, LLP

(57) ABSTRACT

An aqueous polyurethane resin dispersion containing a polyurethane resin obtained by reacting (A) a polyurethane prepolymer obtained by reacting (a) a polyisocyanate compound, (b) at least one polyol compound containing a polycarbonate polyol having a number average molecular weight of 400 to 3000, (c) an acidic group-containing polyol compound, and (d) a blocking agent for an isocyanate group, which dissociates at 80 to 180° C., and (B) a chain elongating agent having reactivity with the isocyanate group, being dispersed in an aqueous medium, a sum of a content of urethane bondings and a content of urea bondings is 7 to 18% by weight of solid components, a content of carbonate bondings is 15 to 40% by weight of solid components, and a content of an isocyanate group to which the above-mentioned blocking agent has bonded is 0.2 to 3% by weight of solid components and calculated on the isocyanate group.

15 Claims, No Drawings

(56) References Cited

U.S. PATENT DOCUMENTS

| | | | |
|---|---|---|---|
| 2008/0103282 A1 | 5/2008 | Nagamatsu et al. | |
| 2008/0146767 A1 | 6/2008 | Wamprecht et al. | |
| 2008/0188625 A1* | 8/2008 | Uchida et al. | 525/403 |
| 2008/0194775 A1 | 8/2008 | Blum et al. | |
| 2009/0012201 A1 | 1/2009 | Kim et al. | |
| 2009/0118422 A1 | 5/2009 | Uchida et al. | |
| 2010/0222448 A1 | 9/2010 | Ziegler et al. | |
| 2011/0077352 A1 | 3/2011 | Nakamura et al. | |
| 2011/0112245 A1 | 5/2011 | Nakamura et al. | |
| 2011/0168603 A1 | 7/2011 | Pettersson | |

FOREIGN PATENT DOCUMENTS

| | | | | |
|---|---|---|---|---|
| JP | 2-289616 A | | 11/1990 | |
| JP | 2-306427 A | | 12/1990 | |
| JP | 3-126912 A | | 5/1991 | |
| JP | 3-140318 A | | 6/1991 | |
| JP | 3-174429 A | | 7/1991 | |
| JP | 3-220233 A | | 9/1991 | |
| JP | 4-41517 A | | 2/1992 | |
| JP | 4-503226 A | | 6/1992 | |
| JP | 5-9434 A | | 1/1993 | |
| JP | 5-39340 A | | 2/1993 | |
| JP | 06-200149 A | | 7/1994 | |
| JP | 06248046 A | * | 9/1994 | C08G 18/44 |
| JP | 7-41539 A | | 2/1995 | |
| JP | 8-193181 A | | 7/1996 | |
| JP | 10-72520 A | | 3/1998 | |
| JP | 10-120757 A | | 5/1998 | |
| JP | 10-130354 A | | 5/1998 | |
| JP | 10-273514 A | | 10/1998 | |
| JP | 11-152321 A | | 6/1999 | |
| JP | 2000-212240 A | | 8/2000 | |
| JP | 2001-354615 A | | 12/2001 | |
| JP | 2002-128851 A | | 5/2002 | |
| JP | 2002-179758 A | | 6/2002 | |
| JP | 2002-179787 A | | 6/2002 | |
| JP | 2003-342335 A | | 12/2003 | |
| JP | 2005-8888 A | | 1/2005 | |
| JP | 2005-60643 A | | 3/2005 | |
| JP | 2005-113318 A | | 4/2005 | |
| JP | 2005-220255 A | | 8/2005 | |
| JP | 200-232447 A | | 9/2005 | |
| JP | 2005-281544 A | | 10/2005 | |
| JP | 2006-206744 A | | 8/2006 | |
| JP | 2006-307215 A | | 11/2006 | |
| JP | 2006-335951 A | | 12/2006 | |
| JP | 2007-39673 A | | 2/2007 | |
| JP | 2007-119749 A | | 5/2007 | |
| JP | 2007-245369 A | | 9/2007 | |
| JP | 2008-37987 A | | 2/2008 | |
| JP | 2008-56760 A | | 3/2008 | |
| JP | 2008-150590 A | | 7/2008 | |
| JP | 2008-534710 A | | 8/2008 | |
| JP | 2008-248014 A | | 10/2008 | |
| JP | 2008-303284 a | | 12/2008 | |
| JP | 2008-303285 A | | 12/2008 | |
| JP | 2009-523188 A | | 6/2009 | |
| JP | 2010-215885 A | | 9/2010 | |
| JP | 2010-222554 A | | 10/2010 | |
| WO | WO 2006/93355 A1 | | 9/2006 | |
| WO | WO 2006/101433 A1 | | 9/2006 | |
| WO | WO 2007/005808 A2 | | 1/2007 | |
| WO | WO 2008/078754 A1 | | 7/2008 | |
| WO | WO 2009/145242 A1 | | 12/2009 | |
| WO | WO 2010/004951 A1 | | 1/2010 | |
| WO | WO 2010/098316 A1 | | 9/2010 | |

OTHER PUBLICATIONS

International Preliminary Report on Patentability and Written Opinion of the International Searching Authority (Forms PCT/IB/338, PCT/IB/373 and PCT/ISA/237), dated Sep. 22, 2011, for Application No. PCT/JP2010/052759.
International Search Report, dated Jun. 1, 2010, for Application No. PCT/JP2010/052758.
International Search Report, dated Jun. 1, 2010, for Application No. PCT/JP2010/052759.
International Search Report for PCT/JP2010/052757 dated May 25, 2010.
Supplementary European Search Report for corresponding European Patent Application No. 10746197.2, dated Jul. 20, 2012.
Non-Final Office Action for related U.S. Appl. No. 13/386,306, dated Dec. 26, 2012.
Final Office Action for related U.S. Appl. No. 13/203,450, dated Feb. 8, 2013.
Supplementary European Search Report for European Patent Application No. 09794396.3, dated Dec. 5, 2012.
Non-Final Office Action for related U.S. Appl. No. 13/508,934, dated Mar. 28, 2013.
Extended European Search Report dated Jun. 21, 2011 for European Patent Application No. 09797804.3.
International Preliminary Report on Patentability and English translation of the Written Opinion of the International Searching Authority (Forms PCT/IB/338, PCT/IB/373 and PCT/ISA/237) dated Mar. 22, 2012 for International Application No. PCT/JP2010/063087.
International Preliminary Report on Patentability and English translation of the Written Opinion of the International Searching Authority (Forms PCT/IB/338, PCT/IB/373 and PCT/ISA/237) dated on Feb. 17, 2011 for International Application No. PCT/JP2009/061892.
International Preliminary Report on Patentability and English translation of the Written Opinion of the International Searching Authority (Forms PCT/IB/338, PCT/IB/373 and PCT/ISA/237), dated Feb. 17, 2011 for Application No. PCT/JP2009/062276.
International Preliminary Report on Patentability, and English translation of the Written Opinion of the International Searching Authority (Forms PCT/IB/338, PCT/IB/373 and PCT/ISA/237); dated Jun. 21, 2012, for International Application No. PCT/JP2010/069789.
Internationai Preliminary Report on Patentability, and English translation of Written Opinion of the International Searching Authority (Forms PCT/IB/338, PCT/IB/373 and PCT/ISA/237), dated Feb. 16, 2012, for International Application No. PCT/JP2010/062419.
International Search Report for PCT/JP2009/061892 dated Jul. 28, 2009.
International Search Report for PCT/JP2010/062419 dated Nov. 9, 2010.
International Search Report for PCT/JP2010/033087, dated Nov. 16, 2010.
International Search Report for PCT/JP2010/069789 dated Feb. 22, 2011.
International Search Report, dated Oct. 13, 2009, issued in PCT/JP2009/062276.
International Search Report, dated Sep. 15, 2009, issued in PCT/JP2009/059735.
Matsunaga, "Latest Polyurethane Material and Applied Technique—Road to Polyurethane Production", The Comprehensive Materials and Technology for a Novel Polyurethane Production, CMC Publishing Co., Ltd., Chapter 2, pp. 43, Sep. 30, 2005.
Odian, "Principles of Polymerization", John Wiley & Sons, Inc., Third Edition, 7 pages, 1991.
U.S. Office Action, dated Jul. 24, 2012, for U.S. Appl. No. 13/203,247.
U.S. Office Action dated Jun. 27, 2012, for U.S. Appl. No. 13/203,450.
U.S. Office Action, dated Oct. 17, 2012, for U.S. Appl. No. 13/003,512.
U.S. Office Action, dated Oct. 4, 2012, for U.S. Appl. No. 12/994,692.
Final Office Action for related U.S. Appl. No. 13/203,247, dated Feb. 20, 2013.
Non-Final Office Action for related U.S. Appl. No. 13/203,450, dated Aug. 8, 2013.
Office Action for U.S. Appl. No. 13/003,512, dated Jun. 4, 2013.
Final Office Action for related U.S. Appl. No. 13/386,308, dated Aug. 15, 2013.
A Non-Final Office Action for related U.S. Appl. No. 13/386,308, dated Jun. 19, 2014.

* cited by examiner

AQUEOUS POLYURETHANE RESIN DISPERSION AND PROCESS FOR PREPARING THE SAME

CROSS REFERENCE TO RELATED APPLICATIONS

This application is a U.S. National Phase application under 35 U.S.C. §371 of PCT Application No. PCT/JP2010/052,757, filed Feb. 23, 2010, which claims priority under 35 U.S.C. §119 (a)-(d) of Japanese Patent Application No. 2009-042483, filed Feb. 26, 2009.

TECHNICAL FIELD

The present invention relates to an aqueous polyurethane resin dispersion in which a polyurethane resin is dispersed in an aqueous medium and a process for preparing the same. The present invention also relates to a coating composition containing the above-mentioned aqueous polyurethane resin dispersion and a laminated material in which a coating layer obtained by heating and drying a composition containing the above-mentioned polyurethane resin dispersion is provided on a surface of a substrate material.

BACKGROUND ART

An aqueous polyurethane resin dispersion is a material now substituting for a conventional solvent type polyurethane as an environment-friendly material since it can provide a coating film having adhesive property, abrasion resistance and rubbery properties, and a volatile organic material can be reduced as compared with the conventional solvent type polyurethane.

A polycarbonate polyol is a useful compound as a starting material for preparing a polyurethane resin which is used for preparing a polyurethane resin having durability to be used for a hard foam, a soft foam, a paint, an adhesive, artificial leather, ink binder etc., by the reaction with an isocyanate compound. It has been described that characteristics of the polyurethane resin using the polycarbonate polyol are revealed by high cohesive force due to the carbonate group, and the material is excellent in water resistance, heat resistance, oil resistance, recovery of elasticity, abrasion resistance and weather resistance (see Non-Patent Literature 1). Also, in a coating film obtained by coating an aqueous polyurethane resin dispersion using a polycarbonate polyol as a starting material, it has been known that the film is excellent in light resistance, heat resistance, hydrolysis resistance and oil resistance (see Patent Literature 1).

The aqueous polyurethane resin dispersion using a polycarbonate polyol shows good characteristics as mentioned above, but its characteristics are not necessarily sufficient as compared with those using an organic solvent type polyurethane. In particular, solvent resistance and water resistance of the coated film are insufficient. It has been carried out to introduce a cross-linking structure into a polyurethane resin or to add a crosslinking material such as an epoxy resin and a polyfunctional isocyanate, etc. to carry out cross-linking at the time of curing for the purpose of improving such characteristics. Of these, an aqueous polyurethane resin dispersion having a blocked isocyanate group is stable at normal temperature, so that it has high utilization value as an one-component cross-linkable dispersion having high storage stability (Patent Literature 2 and Patent Literature 3). An aqueous polyurethane resin dispersion using a polycarbonate polyol as a starting material has been known that it has characteristics of having high adhesiveness to an electrodeposition film (Patent Literature 4).

[Patent Literature 1] JP H10-120757A
[Patent Literature 2] JP 2002-128851A
[Patent Literature 3] JP 2000-104015A
[Patent Literature 4] JP 2005-220255A
[Non-Patent Literature 1] "Latest polyurethane material and applied techniques" published by CMC Publishing Co., Ltd., Chapter 2, p. 43

DISCLOSURE OF THE INVENTION

Problems to be Solved by the Invention

When an aqueous polyurethane resin dispersion is used as a material for a film, a paint or a coating, coating to a substrate material, etc., is carried out by using a coating device such as a bar coater, roll coater, air spray, etc.

The conventional aqueous polyurethane resin dispersion which can form a coating film having high solvent resistance and water resistance involves a problem that after coating to a substrate material, it is difficult to remove the paint layer of coated film by washing or peeling the same and to recoat the paint. In particular, when an aqueous polyurethane resin dispersion having high adhesiveness to the substrate material is once coated thereon, for peeling off the formed film therefrom, it is necessary to dissolve or redisperse the coated film by using an organic solvent, etc. However, when an organic solvent or a large amount of a surfactant is used, there are problems that the treatment of the waste solution becomes troublesome, the substrate material is dissolved, or other coated film coated on the substrate material is also peeled off, etc.

On the other hand, it has earnestly been desired to develop an aqueous polyurethane resin dispersion which can form a coating film having high impact resistance, high adhesiveness to an electrodeposition film, and which can be easily recoated, or a paint or a coated film coated onto an extra portion be easily removable, for the preparation of a protective film for an electrodeposition film coated on a steel plate such as construction materials, electric devices, vehicles, industrial devices, office machines, etc.

Means to Solve the Problems

The present invention has been done to solve the above-mentioned problems, and specifically has the following constitution.

[1] An aqueous polyurethane resin dispersion which comprises a polyurethane resin obtained by reacting (A) a polyurethane prepolymer which can be obtained by reacting (a) a polyisocyanate compound, (b) one or more polyol compound containing a polycarbonate polyol having a number average molecular weight of 400 to 3000, (c) an acidic group-containing polyol compound, and (d) a blocking agent for an isocyanate group, which dissociates at 80 to 180° C., and (B) a chain elongating agent having reactivity with the isocyanate group, being dispersed in an aqueous medium, a sum of a content of urethane bodings and a content of urea bondings is 7 to 18% by weight in terms of a solid component(s), a content of carbonate bondings is 15 to 40% by weight in terms of a solid component(s), and a content of the isocyanate group to which the above-mentioned blocking agent has bonded is 0.2 to 3% by weight in terms of a solid component(s) and calculated on the isocyanate group.

[2] The aqueous polyurethane resin dispersion described in the above-mentioned [1], wherein the polyurethane resin has a weight average molecular weight of 10,000 to 80,000.
[3] The aqueous polyurethane resin dispersion described in the above-mentioned [1] or [2], wherein an acid value is 10 to 40 mg KOH/g in terms of a solid component(s).
[4] The aqueous polyurethane resin dispersion described in any one of the above-mentioned [1] to [3], wherein the polyurethane resin contains an alicyclic structure, and a content of the alicyclic structure is 10 to 40% by weight in terms of a solid component(s).
[5] The aqueous polyurethane resin dispersion described in any one of the above-mentioned [1] to [4], wherein (b) the polyol compound contains a polycarbonate polyol having an alicyclic structure.
[6] The aqueous polyurethane resin dispersion described in any one of the above-mentioned [1] to [5], wherein (a) the polyisocyanate compound is an alicyclic diisocyanate.
[7] The aqueous polyurethane resin dispersion described in any one of the above-mentioned [1] to [6], wherein (d) the blocking agent is one or more selected from the group consisting of an oxime series compound, a pyrazole series compound and a malonic acid diester series compound.
[8] A process for preparing the aqueous polyurethane resin dispersion according to any one of the above-mentioned [1] to [7], which comprises
a step of reacting (a) a polyisocyanate compound, (b) a polyol compound, (c) an acidic group-containing polyol compound and (d) a blocking agent to obtain a polyurethane prepolymer,
a step of neutralizing an acidic group of the polyurethane prepolymer,
a step of dispersing the polyurethane prepolymer in an aqueous medium, and
a step of reacting the polyurethane prepolymer with (B) a chain elongating agent.
[9] A coating composition which comprises the aqueous polyurethane resin dispersion according to any one of the above-mentioned [1] to [7].
[10] A polyurethane resin film obtained by coating, heating and drying a composition containing the aqueous polyurethane resin dispersion according to any one of the above-mentioned [1] to [7] on a surface of a substrate material.

Effects of the Invention

According to the present invention, an aqueous polyurethane resin dispersion in which a film-forming rate after coating is controlled and the resulting coated film can be easily dispersed in water again can be provided. By using the aqueous polyurethane resin dispersion of the present invention, after coating on a substrate material, repaint or removal of an extra coating film can be easily carried out so that its utility and convenience are high.

Also, the coating film obtained by coating the aqueous polyurethane resin dispersion of the present invention and subjecting to a heat treatment is excellent in water resistance and solvent resistance, also excellent in adhesiveness to an electrodeposition film, and have sufficient tensile characteristics.

BEST MODE TO CARRY OUT THE INVENTION (a) Polyisocyanate Compound

The polyisocyanate compound (a) which can be used in the present invention is not particularly limited, and a diisocyanate compound having two isocyanate groups per one molecule is preferred.

More specifically, there may be mentioned an aromatic polyisocyanate compound such as 1,3-phenylenediisocyanate, 1,4-phenylenediisocyanate, 2,4-tolylene-diisocyanate (TDI), 2,6-tolylenediisocyanate, 4,4'-diphenylenemethane diisocyanate (MDI), 2,4-diphenylmethane diisocyanate, 4,4'-diisocyanate biphenyl, 3,3'-dimethyl-4,4'-diisocyanate biphenyl, 3,3'-dimethyl-4,4'-diisocyanatodiphenylmethane, 1,5-naphthylene diisocyanate, m-isocyanatophenylsulfonyl isocyanate, p-isocyanatophenyl-sulfonyl isocyanate, etc.; an aliphatic polyisocyanate compound such as ethylene diisocyanate, tetramethylene diisocyanate, hexamethylene diisocyanate (HDI), dodecamethylene diisocyanate, 1,6,11-undecanetriisocyanate, 2,2,4-trimethylhexa-methylene diisocyanate, lysine diisocyanate, 2,6-diisocyanate methylcaproate, bis(2-isocyanatoethyl)fumarate, bis(2-isocyanatoethyl)carbonate, 2-isocyanatoethyl-2,6-diisocyanate hexanoate, etc.; and an alicyclic polycyanate compound such as isophorone diisocyanate (IPDI), 4,4'-dicyclohexylmethane diisocyanate (hydrogen-added MDI), cyclohexylene diisocyanate, methylcyclohexylene diisocyanate (hydrogen added TDI), bis(2-isocyanatoethyl)-4-cyclohexene-1,2-dicarboxylate, 2,5-norbornane diisocyanate, 2,6-norbornane diisocyanate, etc. These polyisocyanate compounds may be used a single kind alone, or two or more kinds in combination.

Of the above-mentioned (a) polyisocyanate compounds, the alicyclic polyisocyanate compound is preferred. By using the above-mentioned alicyclic polyisocyanate compound, a coating film difficultly yellowing can be obtained, and a hardness of the resulting coating film tends to be heightened. As the alicyclic polyisocyanate compound, an alicyclic diisocyanate compound is preferred.

Of these, in the view points of controlling the reactivity and having high modulus of elasticity of the resulting coating film, isophorone diisocyanate (IPDI) and/or 4,4'-dicyclohexylmethane diisocyanate (hydrogen-added MDI) is/are particularly preferred.

(b) Polyol Compound

The polyol compound (b) of the present invention is one or more kinds of polyol compound(s) containing a polycarbonate polyol having a number average molecular weight of 400 to 3000.

[[(b-1) Polycarbonate Polyol Having a Number Average Molecular Weight of 400 to 3000]]

The polycarbonate polyol having a number average molecular weight of 400 to 3000 which can be used in the present invention is not particularly limited so long as it has a number average molecular weight of 400 to 3000. If the number average molecular weight of the above-mentioned polycarbonate polyol is less than 400, there is a problem that a breaking energy at the time of tension of the resulting coating film is low, etc. If the number average molecular weight of the above-mentioned polycarbonate polyol exceeds 3000, there is a problem that a film-forming property of the resulting aqueous polyurethane resin is poor, etc. Thus, the number average molecular weight is more preferably 800 to 2500 in the view point of film-forming property. It is also preferred to use a polycarbonate diol having two hydroxyl groups per one molecule.

As the above-mentioned polycarbonate polyol, a polycarbonate polyol prepared by the general preparation method such as an ester exchange method of a polyol and a carbonic acid ester, and a phosgene method, etc. may be used.

A ratio of the above-mentioned (b-1) polycarbonate polyol having a number average molecular weight of 400 to 3000 in the above-mentioned (b) polyol compound is preferably 50 to 100% by weight in the view point of a breaking energy at the time of tension of the resulting coating film, more preferably 70 to 100% by weight, particularly preferably 85 to 100% by weight. In the present invention, a number average molecular weight (Mn) of the polycarbonate polyol can be obtained from the hydroxyl value according to the following formula.

Mn=(56100×number of valence)/a hydroxyl value

In the above-mentioned formula, the number of valence is a number of a hydroxyl group(s) in one molecule, and the hydroxyl value is measured by the method B according to JIS K 1557. When the polycarbonate polyol is a polycarbonate diol, then the number of valence is 2.

The polyols which become the starting material of the above-mentioned polycarbonate polyol may be mentioned aliphatic diols such as ethylene glycol, 1,3-propanediol, 1,4-butanediol, 1,5-pentanediol, 1,6-hexanediol, 1,7-pentanediol, 1,8-octanediol, 1,9-nonanediol, 1,10-decanediol, 1,12-dodecanediol, etc., and 1,3-butane-diol, 3-methylpentane-1,5-diol, 2-ethylhexane-1,6-diol, 2-methyl-1,3-pentanediol, neopentylglycol, 2-methyl-1,8-octanediol, etc.; alicyclic diols such as 1,3-cyclohexane-diol, 1,4-cyclohexanediol, 2,2'-bis(4-hydroxycyclohexyl)propane, 1,4-cyclohexane-dimethanol, etc.; aromatic diols such as 1,4-benzenedimethanol, etc.; and poly-functional polyols such as trimethylolpropane, pentaerythritol, etc. The above-mentioned polyols may be used singly to prepare the above-mentioned polycarbonate polyol, or may be used in a plural number thereof to prepare a polycarbonate polyol.

The above-mentioned polycarbonate polyol is preferably a polycarbonate polyol containing the above-mentioned aliphatic diol or alicyclic diol unit, more preferably a polycarbonate polyol containing the above-mentioned alicyclic diol unit, and particularly preferably a polycarbonate polyol containing 1,4-cyclohexane-dimethanol unit.

In the present invention, the aliphatic diol unit and alicyclic diol unit mean the portion derived from an aliphatic diol and alicyclic diol, and the portion in which the hydrogen atom at the hydroxyl group of the aliphatic diol and alicyclic diol is removed.

[[(b-2) Other Polyol Compound]]

In the present invention, in (b) the polyol compound, in addition to the above-mentioned (b-1) polycarbonate polyol having a number average molecular weight of 400 to 3000, (b-2) other polyol compound(s) can be mixed.

The above-mentioned other polyol compound(s) is not particularly limited, and there may be mentioned, for example, a polyester polyol, a polyether polyol, a poly-carbonate polyol having a number average molecular weight of other than 400 to 3000, an aliphatic diol, an alicyclic diol, an aromatic diol, a poly-functional polyol, etc. Of these, an aliphatic diol, an alicyclic diol, and a polycarbonate polyol having a number average molecular weight of other than 400 to 3000 are preferred. Here, in the (b-2) other polyol compound(s), (c) an acidic group-containing polyol compound mentioned in the next paragraph is not contained.

(c) Acidic Group-Containing Polyol Compound

The (c) acidic group-containing polyol compound which can be used in the present invention is not particularly limited so long as it is a compound containing two or more hydroxyl groups and one or more acidic group in one molecule. The acidic group may be mentioned a carboxyl group, a sulfonyl group, a phosphoric acid group, etc.

More specifically, there may be mentioned 2,2-dimethylol alkanoic acid such as 2,2-dimethylol propionic acid, 2,2-dimethylol butanoic acid, etc., N,N-bishydroxy-ethylglycine, N,N-bishydroxyethylalanine, 3,4-dihydroxybutanesulfonic acid, 3,6-dihydroxy-2-toluenesulfonic acid, etc. These may be used a single kind alone or may be used a plural kinds thereof in combination. Among the above-mentioned an acidic group-containing polyol compound, 2,2-dimethylol propionic acid or/and 2,2-dimethylol butanoic acid is/are preferred in the viewpoint of easily obtainable.

(d) Blocking Agent

The blocking agent for the isocyanate group which can be used in the present invention may include those which dissociate from the isocyanate group at 80 to 180° C.

The blocking agent which dissociates from the isocyanate group at 80 to 180° C. may be mentioned, for example, a malonic acid diester series compound such as dimethyl malonate, diethyl malonate, etc.; a pyrazole series compound such as 1,2-pyrazole, 3,5-dimethylpyrazole, etc.; an oxime series compound such as 1,2,4-triazole, methyl ethyl ketoxime, etc.; diisopropylamine, caprolactam, etc. These may be used a single kind alone or may be used a plural kinds thereof in combination.

Among the above-mentioned blocking agent, one or more selected from an oxime series compound, a pyrazole series compound and a malonic acid diester series compound is preferred in the viewpoint of the dissociation temperature, and methylethyl ketoxime is particularly preferred in the viewpoint of preservation stability.

[(A) Polyurethane Prepolymer]

The (A) polyurethane prepolymer which can be used in the present invention is a polyurethane prepolymer obtained by reacting (a) the polyisocyanate compound, (b) the polyol compound, (c) the acidic group-containing polyol compound and (d) the blocking agent.

The preparation method of the above-mentioned polyurethane prepolymer is not particularly limited, and, for example, the following method may be mentioned.

The first one is a method in which (a) the polyisocyanate compound, (b) the polyol compound and (c) the acidic group-containing polyol compound are reacted in the presence or absence of a urethanization catalyst to carry out urethanization, thereafter (d) the blocking agent is reacted therewith in the presence or absence of a blocking catalyst to synthesize (A) a polyurethane prepolymer in which a part of the terminal isocyanate groups is blocked.

The second one is a method in which (a) the polyisocyanate compound and (d) the blocking agent are reacted in the presence or absence of a blocking catalyst to synthesize a polyisocyanate compound in which a part of isocyanate groups is blocked, and the resulting material is reacted with (b) the polyol compound and (c) the acidic group-containing polyol compound in the presence or absence of a urethanization catalyst to synthesize (A) a polyurethane prepolymer.

The above-mentioned urethanization catalyst is not particularly limited, and there may be mentioned, for example, a salt of a metal and an organic and inorganic acid such as a tin series catalyst (trimethyl tin laurate, dibutyl tin dilaurate, etc.) or a lead series catalyst (lead octylate, etc.), etc., and an organometallic derivative, amine series catalyst (triethylamine, N-ethylmorpholine, triethylenediamine, etc.), diazabicycloundecene series catalyst, etc. Of these, dibutyl tin dilaurate is preferred in view of reactivity.

The above-mentioned blocking catalyst is not particularly limited, and there may be mentioned, for example, dibutyl tin dilaurate or an alkali catalyst such as sodium methoxide, etc.

Each amount of (a), (b), (c) and (d) to be used is not particularly limited so long as a sum of a content of urethane bodings and a content of urea bondings being 7 to 18% by weight in terms of a solid component(s), a content of carbonate bondings being 15 to 40% by weight in terms of a solid component(s), and a content of the isocyanate group to which the above-mentioned blocking agent is bonded being 0.2 to 3% by weight in terms of a solid component(s) and calculated on the isocyanate group, and the following amounts are preferred. An amount of the (b) to be used is preferably 0.4 to 0.9-fold based on (a) in terms of a molar standard, more preferably 0.5 to 0.75-fold, and particularly preferably 0.55 to 0.7-fold. An amount of the (c) to be used is preferably 0.2 to 4-fold based on (b) in terms of a molar standard, more preferably 0.5 to 2-fold, and particularly preferably 0.8 to 1.2-fold. An amount of the (d) to be used is preferably 0.01 to 0.4-fold based on (a) in terms of a molar standard, more preferably 0.02 to 0.3-fold, and particularly preferably 0.03 to 0.2-fold.

[(B) Chain Elongating Agent]

The (B) chain elongating agent which can be used in the present invention is not particularly limited, and there may be mentioned, for example, amine compounds such as ethylenediamine, 1,4-tetramethylenediamine, 2-methyl-1,5-pentanediamine, 1,6-hexamethylenediamine, 1,4-hexamethylenediamine, 3-aminomethyl-3,5,5-trimethylcyclohexylamine, 1,3-bis(aminomethyl)cyclohexane, xylylenediamine, piperazine, 2,5-dimethylpiperazine, diethylenetriamine, triethylenetetramine, hydrazine, etc., polyalkylene glycols represented by the diol compound and polyethylene glycol such as ethylene glycol, propylene glycol, 1,4-butanediol, 1,6-hexanediol, etc., and water, etc., and among these, preferably mentioned is a primary diamine compound. These may be used a single kind alone or may be used a plural kinds thereof in combination.

An amount of the above-mentioned (B) chain elongating agent to be added is preferably an equivalent amount or less of the isocyanate group in the above-mentioned (A) polyurethane prepolymer which is not blocked and becomes a starting point of chain elongation, more preferably 0.7 to 0.99 equivalent of the isocyanate group which is not blocked. If the chain elongating agent is added in excess of the equivalent amount of the isocyanate group which is not blocked, a molecular weight of the chain elongated polyurethane polymer is lowered in some cases, and the strength of the coated film obtained by coating the resulting aqueous polyurethane resin dispersion is lowered in some cases.

[Aqueous Polyurethane Resin Dispersion]

A preparation method of the aqueous polyurethane resin dispersion of the present invention is not particularly limited, and there may be mentioned, for example, a preparation method containing a step of reacting (a) a polyisocyanate compound, (b) a polyol compound, (c) an acidic group-containing polyol compound and (d) a blocking agent to obtain a polyurethane prepolymer,
a step of neutralizing an acidic group in the above-mentioned polyurethane prepolymer,
a step of dispersing the above-mentioned polyurethane prepolymer in an aqueous medium, and
a step of reacting the above-mentioned polyurethane prepolymer with (B) a chain elongating agent.

Also, in the above-mentioned preparation method, addition of the chain elongating agent may be after dispersing the polyurethane prepolymer in an aqueous medium, or may be during the dispersion.

The above-mentioned respective steps may be carried out under inert gas atmosphere, or may be in the air.

In particular, in the view point that preparation operation is easy, the preparation method of the aqueous polyurethane resin dispersion of the present invention preferably contains (1) a step of reacting (a) a polyisocyanate compound, (b) a polyol compound, (c) an acidic group-containing polyol compound and (d) a blocking agent to prepare a polyurethane prepolymer,
(2) a step of neutralizing an acidic group in the polyurethane prepolymer obtained in the step (1),
(3) a step of dispersing the polyurethane prepolymer obtained in the step (2) in an aqueous medium, and
(4) a step of reacting the polyurethane prepolymer obtained in the step (3) with (B) a chain elongating agent to obtain an aqueous polyurethane resin dispersion.

In the aqueous polyurethane resin dispersion of the present invention, it is required to be the sum of the urethane bondings and urea bondings in the above-mentioned aqueous polyurethane resin dispersion to be 7 to 18% by weight in terms of a solid component(s), and particularly preferably 8 to 15% by weight.

If the sum of the contents of the above-mentioned urethane bondings and urea bondings is too little, there are problems that a coating film cannot be formed, and after drying, the surface of the coating film is sticky, etc. Also, if the sum of the contents of the above-mentioned urethane bondings and urea bondings is too much, when the aqueous polyurethane resin dispersion is coated on a substrate material, redispersibility of the paint or coated film into a solvent is poor so that removal thereof is difficult, and recoat cannot be carried out in some cases.

The sum of the contents of the urethane bondings and urea bondings can be controlled by the respective molecular weights of (a) the polyisocyanate compound, (b) the polyol compound, (c) the acidic group-containing polyol compound, (d) the blocking agent and (B) the chain elongating agent, each number of hydroxyl groups, isocyanate groups and amino groups in one molecule and contents of the respective starting materials in the aqueous polyurethane resin dispersion in terms of solid components.

In the aqueous polyurethane resin dispersion of the present invention, it is required that a content of the carbonate bondings in the above-mentioned aqueous polyurethane resin dispersion to be 15 to 40% by weight in terms of a solid component(s), and particularly preferably 18 to 35% by weight.

If the above-mentioned content of carbonate bondings is too little, there are problems that elongation at break of the resulting coating film is a little, and a coating film which is poor against impact can only be obtained. Also, if the above-mentioned content of carbonate bondings is too much, there are problems that a coating film cannot be formed, and after drying, the surface of the coating film is sticky, etc.

The content of the carbonate bondings can be controlled by the number average molecular weight and a used ratio in the aqueous polyurethane resin dispersion in terms of a solid component(s) of the polycarbonate polyol, a molecular weight of the polyol unit constituting the polycarbonate polyol and a kind of the polycarbonate diol. The polyol unit means a unit in which a hydrogen atom is removed from the hydroxyl group of the polyol.

In the aqueous polyurethane resin dispersion of the present invention, it is required that a content of the isocyanate group which is blocked by a blocking agent is required to be 0.2 to 3% by weight in terms of a solid component(s) and calculated on the isocyanate group, and particularly preferably 0.5 to 2% by weight.

If the content of the above-mentioned blocked isocyanate group is too little, there is a problem that adhesiveness of the resulting coating film to the surface of the electrodeposition-coating plate is poor. Also, if the content of the above-mentioned blocked isocyanate group is too much, there are problems that elongation at break of the resulting coating film is a little, and a coating film which is poor against impact can only be obtained.

A content of the isocyanate group which is blocked by a blocking agent can be controlled by a used ratio of (d) the blocking agent in the aqueous polyurethane resin dispersion in terms of a solid component(s), when (d) the blocking agent is used in a molar number less than (X), wherein a molar number of the remaining isocyanate group is made (X) which is obtained by deducting a molar number of the hydroxyl group contained in (b) the polyol compound and a molar number of the hydroxyl group contained in (c) the acidic group-containing polyol compound from a molar number of the isocyanate group contained in (a) the polyisocyanate compound. If an amount of (d) the blocking agent to be used is larger than (X), the content of the isocyanate group blocked by the blocking agent can be determined by the value of (X) in terms of a solid component(s) in the aqueous polyurethane resin dispersion.

A weight average molecular weight of the above-mentioned aqueous poly-urethane resin dispersion is not particularly limited, and preferably 10,000 to 80,000, more preferably 15,000 to 60,000, and particularly preferably 20,000 to 45,000. If the weight average molecular weight of the above-mentioned aqueous polyurethane resin dispersion is less than 10,000, elongation at break of the resulting coated film is a little, and the coated film becomes poor against impact in some cases. Also, if the weight average molecular weight of the above-mentioned aqueous polyurethane resin dispersion exceeds 80,000, when the resulting aqueous polyurethane resin dispersion is coated on a substrate material, redispersibility of the paint or the coated film in a solvent is poor so that it becomes hardly removable, whereby recoating is difficultly applied in some cases.

In the present invention, the weight average molecular weight is a value measured by gel permeation chromatography (GPC), and is a converted value obtained from the calibration curve of the standard polystyrene provisionally prepared.

The acid value of the above-mentioned aqueous polyurethane resin dispersion is not particularly limited, and preferably 10 to 40 mg KOH/g in terms of a solid component(s), more preferably 15 to 32 mg KOH/g, and particularly preferably 15 to 25 mg KOH/g. If the acid value of the above-mentioned aqueous polyurethane resin dispersion is smaller or larger than the range of 10 to 40 mg KOH/g in terms of a solid component(s), dispersibility in an aqueous medium tends to be poor. The acid value can be measured in accordance with an indicator titration method of JIS K 1557. For the measurement, measurement is to be carried out after removing the neutralizing agent which is used for neutralizing the acidic group. For example, when the organic amines are used as a neutralizing agent, the aqueous polyurethane resin dispersion was coated on a glass plate, and a coating film obtained by drying at a temperature of 60° C., under a reduced pressure of 20 mmHg for 24 hours was dissolved in N-methylpyrrolidone (NMP), and the acid value can be measured in accordance with the indicator titration method of JIS K 1557.

The content of the alicyclic structure in the above-mentioned aqueous poly-urethane resin dispersion is not particularly limited, and is preferably 10 to 40% by weight in terms of a solid component(s), more preferably 12 to 30% by weight, and particularly preferably 15 to 25% by weight. If the content of the alicyclic structure in the above-mentioned aqueous polyurethane resin dispersion is too little, modulus of elasticity of the resulting coated film is sometimes low, and hardness of the coated film becomes low in some cases. Also, if the content of the alicyclic structure in the above-mentioned aqueous polyurethane resin dispersion is too much, when the resulting aqueous polyurethane resin dispersion is coated on the substrate material, redispersibility of the paint or the coated film in a solvent is poor so that removal thereof becomes difficult, whereby recoating is difficultly applied in some cases.

[Neutralizing Agent]

It is preferred that the aqueous polyurethane resin dispersion of the present invention is dispersed in an aqueous medium after neutralizing the acidic group of the prepolymer by a neutralizing agent.

The above-mentioned neutralizing agent may be mentioned, for example, organic amines such as trimethylamine, triethylamine, tri-n-propylamine, tributylamine, triethanolamine, aminomethylpropanol, aminomethylpropanediol, amino ethylpropane-diol, trihydroxymethylaminomethane, monoethanolamine, triisopropanolamine, etc., inorganic alkali salts such as potassium hydroxide, sodium hydroxide, etc., and further ammonia, etc. These may be used a single kind alone or may be used a plural kinds thereof in combination.

Among the above-mentioned neutralizing agent, organic amines are preferred in the viewpoint of operatability, and triethylamine is more preferred.

An amount of the neutralizing agent to be added is, for example, 0.4 to 1.2 equivalent per 1 equivalent of the acidic group, and preferably 0.6 to 1.0 equivalent.

[Aqueous Medium]

In the present invention, the polyurethane resin is dispersed in an aqueous medium. The above-mentioned aqueous medium may be mentioned water or a mixed medium of water and a hydrophilic organic solvent, etc.

The above-mentioned water may be mentioned, for example, tap water, deionized water, distilled water, ultrapure water, etc., and preferably deionized water in view of easiness in obtaining the material and the particles being unstable due to the effects of a salt.

The above-mentioned hydrophilic organic solvent may be mentioned lower monovalent alcohols such as methanol, ethanol, propanol, etc.; polyvalent alcohols such as ethylene glycol, glycerin, etc.; and aprotic hydrophilic organic solvents such as N-methylmorpholine, dimethylsulfoxide, dimethylformamide, N-methylpyrrolidone, etc.

An amount of the above-mentioned hydrophilic organic solvent in the above-mentioned aqueous medium is preferably 0 to 20% by weight.

The coating film obtained by coating the aqueous polyurethane resin dispersion of the present invention is excellent in water resistance and solvent resistance, and also excellent in adhesiveness to an electrodeposition film.

As the above-mentioned electrodeposition film, there are two types of anionic type and cationic type. In general, the cationic type uses a modified epoxy resin as a basic resin and crosslinked by an isocyanate, while the anionic type is crosslinked by oxidation polymerization. In the cationic type, secondary hydroxyl group formed by ring-opening of the epoxy group remains, and in the anionic type, a carboxyl group is introduced, so that it can be considered that they occur crosslinking reaction with the free isocyanate group which is formed by dissociation of the blocking agent during the drying step by heating of the aqueous polyurethane resin dispersion of the present invention. Such an electrodeposition film has been utilized for industrial machines such as heavy machines, agricultural machines, etc., vehicles such as an automobile, bicycle, etc., construction materials such as a prefabricated steel frame, a fire door, a sach, etc., and electric devices such as a switchboard, an elevator, a microwave oven, etc.

The aqueous polyurethane resin dispersion of the present invention may be coated, for example, on a substrate material on which the above-mentioned electrodeposition film has formed by using a coating device, etc., and baked at a temperature of 80 to 250° C. Before the baking step, a drying step may be provided, or the aqueous polyurethane resin dispersion is coated and dried, and other paint, etc., is/are coated thereon and dried, then, the material can be baked at once.

When the coated aqueous polyurethane resin dispersion is being baked, the blocking agent of the blocked isocyanate group is dissociated, and dissociated isocyanate group(s) forms a crosslinking structure with an acidic group or the other isocyanate group, etc., whereby it can be considered to form a coating film having more firm adhesiveness and higher hardness.

The above-mentioned baking step and the above-mentioned drying step can be carried out by the general methods.

[Coating Composition]

As the coating composition of the present invention, the above-mentioned aqueous polyurethane resin dispersion may be used as such, or various additives may be added thereto.

The above-mentioned additives may be mentioned a plasticizer, defoaming agent, leveling agent, mildewproofing agent, anticorrosive agent, matting agent, flame retardant, tackifier, thixotropic agent, lubricant, antistatic agent, viscosity depressant, thickening agent, diluent, pigment, dye, UV absorber, photostabilizer, antioxidant, filler, film-forming aid, etc.

The coating composition of the present invention can be coated onto the various substrates such as metal, ceramics, synthetic resin, nonwoven fabric, woven fabric, knitted fabrics, paper, etc.

[Polyurethane Resin Film]

The polyurethane resin film of the present invention can be prepared by coating, heating and drying the composition containing the above-mentioned aqueous polyurethane resin dispersion.

The composition containing the above-mentioned aqueous polyurethane resin dispersion may be used the above-mentioned aqueous polyurethane resin dispersion itself as such, or various additives may be added to the above-mentioned aqueous polyurethane resin dispersion.

The above-mentioned additives may be mentioned a plasticizer, defoaming agent, leveling agent, mildewproofing agent, anticorrosive agent, matting agent, flame retardant, tackifier, thixotropic agent, lubricant, antistatic agent, viscosity depressant, thickening agent, diluent, pigment, dye, UV absorber, photostabilizer, antioxidant, filler, film-forming aid, etc.

The preparation method of the above-mentioned polyurethane resin film is not particularly limited, and there may be mentioned, for example, a method in which the composition containing the above-mentioned aqueous polyurethane resin dispersion is coated on a releasable substrate material by using various coating devices, and dried, then, the above-mentioned releasable substrate material and the above-mentioned polyurethane resin film are peeled off.

The above-mentioned releasable substrate material is not particularly limited, and there may be mentioned, for example, a glass substrate material, a plastic substrate material such as polyethyleneterephthalate and polytetrafluoroethylene, etc., a metal substrate material, etc. The surface of the above-mentioned respective substrate materials may be treated by a peeling agent.

The above-mentioned coating device is not particularly limited, and there may be mentioned, for example, a bar coater, a roll coater, a gravure roll coater, an air spray, etc.

A thickness of the polyurethane resin film of the present invention is not particularly limited, and preferably 0.01 to 0.5 mm.

EXAMPLES

Next, the present invention will be explained in more detail by referring to Examples and Comparative examples, but the scope of the present invention is not limited by these.

Measurements of the physical properties are carried out as follows.

(1) Hydroxyl value: measured in accordance with the method B of JIS K 1557.

(2) Free isocyanate group content: The reaction mixture after completion of the urethanization reaction was sampled in an amount of 0.5 g, and added to a mixed solution comprising 10 mL of 0.1 mol/L (liter) dibutylamine-tetrahydrofuran (THF) solution and 20 mL of THF, and unconsumed dibutylamine was titrated with 0.1 mol/L of hydrochloric acid. From the difference between the titrated value and a blank experiment, a molar concentration of the isocyanate group remained in the reaction mixture was calculated. The molar concentration was converted into a weight ratio of the isocyanate group and made it as a content of the free isocyanate groups. The indicator used in the titration was bromophenol blue.

(3) Acid value: An aqueous polyurethane resin dispersion was coated on a glass plate with a thickness of 0.2 mm, and dried at a temperature of 60° C. under reduced pressure of 20 mmHg for 24 hours to obtain a coated film. The obtained coated film was dissolved in N-methylpyrrolidone (NMP), and an acid value in terms of a solid component was measured in accordance with the indicator titration method of JIS K 1557.

(4) As a content of the urethane bondings in terms of a solid component(s) and a content of the urea bondings in terms of a solid component(s), molar concentrations (mol/g) of the urethane bondings and urea bondings were calculated from the charged ratios of respective starting materials for an aqueous polyurethane resin dispersion, and a converted value to a weight ratio was shown. The weight ratio is based on the solid components of the aqueous polyurethane resin dispersion. On a glass substrate was coated 0.3 g of an aqueous polyurethane resin dispersion with a thickness of 0.2 mm, and after dying at 140° C. for 4 hours, the remained weight was measured and was divided by the weight before drying to use it as a sold component concentration. The product of the total weight of the aqueous polyurethane resin dispersion and the solid component concentration was made a solid component weight, and the above-mentioned weight ratio was calculated.

(5) As a content of the carbonate bondings in terms of a solid component(s), a molar concentration (mol/g) of the carbonate bondings was calculated from the charged ratios of respective starting materials for an aqueous polyurethane resin dispersion, and a converted value to a weight ratio was shown. The weight ratio is based on the solid components of the aqueous polyurethane resin dispersion, and calculated according to the same method as the content of the above-mentioned urethane bondings in terms of a solid component(s).

(6) As a content of the alicyclic structure in terms of a solid component(s), a weight ratio of alicyclic structure calculated from the charged ratios of respective starting materials for an aqueous polyurethane resin dispersion was shown. The weight ratio is based on the solid components of the aqueous polyurethane resin dispersion, and calculated according to the same method as the content of the above-mentioned urethane bondings in terms of a solid component(s).

(7) A weight average molecular weight of the polyurethane resin in the aqueous polyurethane resin dispersion is measured by gel permeation chromatography (GPC), and a converted value obtained from the calibration curve of the standard polystyrene provisionally prepared was mentioned.

(8) As a content of the isocyanate group (calculated on the isocyanate group) to which a blocking agent is bonded in terms of a solid component(s) in an aqueous polyurethane resin dispersion, a charged molar amount of the blocking agent was concerted into a weight of the isocyanate group and divided by a weight of the solid component(s) of the aqueous polyurethane resin dispersion, and the resulting value was shown. The weight of the solid component(s) of the aqueous polyurethane resin dispersion was calculated according to the same method as the content of the above-mentioned urethane bondings in terms of a solid component(s).

(9) The maximum drying time of the coated film capable of redispersing in water was measured as follows. The aqueous polyurethane resin dispersion was coated on a glass plate with a size of 20 mm×60 mm and a thickness of 0.6 mm, and dried in a thermostat room at 23° C. by allowing to stand for each 15 minutes, 30 minutes, 45 minutes, 60 minutes, 75 minutes and 90 minutes. When the respective glass plates were immersed in water at 20° C. for 3 minutes, and whether the coated film had been completely peeled off or not only by stirring water was observed with naked eyes. For example, when the coated film was completely peeled off by drying in a thermostat room for 30 minutes, and not completely peeled off by drying for 45 minutes, it was described that a maximum drying time of the coated film capable of redispersing in water was 30 minutes. When the coated film was not completely peeled off by drying in a thermostat room for 15 minutes, it was described that a maximum drying time of the coated film capable of redispersing in water was <15 minutes. Also, even when the coated film was completely peeled off by drying in a thermostat room for 90 minutes, it was described that a maximum drying time of the coated film capable of redispersing in water was >90 minutes.

(10) The film-forming time was measured as follows. The aqueous polyurethane resin dispersion was coated on a glass plate with a thickness of 0.2 mm, and a time until the film had been formed was measured by a drying time recorder (manufactured by Gardner Co.). The measurement conditions are employed by a room temperature of 23° C., a humidity of 25%, and a weight of the drying time recorder of 5 g of a weight.

(11) Solvent resistance was evaluated as follows. An aqueous polyurethane resin dispersion was coated on a glass plate with a thickness of 0.2 mm, and after drying at 120° C. for 3 hours, and at 140° C. for 30 minutes, one drop of toluene was spotted on the resulting coated film by a Pasteur pipette, allowing to stand at 25° C. for 1 hour and then the toluene on the coated film was wiped off. After wiped off the toluene, whether a trace of the toluene remains on the coated film or not was confirmed with naked eyes, and the case where no trace remained was evaluated as "○", and the case where the trace remained was evaluated as "X".

(12) Water resistance was evaluated as follows. The aqueous polyurethane resin dispersion was coated on a glass plate with a thickness of 0.2 mm, and after drying at 120° C. for 3 hours, and at 140° C. for 30 minutes, one drop of water was spotted on the resulting coated film by a Pasteur pipette, allowing to stand at 25° C. for 1 hour and then the water on the coated film was wiped off. After wiped off the water, whether a trace of the water remains on the coated film or not was confirmed with naked eyes, and the case where no trace remained was evaluated as "○", and the case where the trace remained was evaluated as "X".

(13) Adhesiveness to the surface of the electrodeposited layer was evaluated as follows. An aqueous polyurethane resin dispersion was coated on a cation electrodeposition coating plate for an automobile steel plate (manufactured by Nippon Testpanel Co., Ltd.) with a thickness of 0.2 mm, and after drying at 120° C. for 3 hours, and at 140° C. for 30 minutes, a cross-cut peel test was carried out by using the resulting coated film. The coated film was cross cut with a distance of 1 mm in length and breadth in an area of 5 mm×5 mm, adhering an adhesive tape thereon, and when the tape was peeled off, then a number of cross cuts remained on the surface of the electrodeposited layer was counted with naked eyes to carry out evaluation. When 15 cuts were remained among 25 cuts, it was described as 15/25.

(14) A modulus of elasticity, tensile strength and elongation at break of the poly-urethane resin film were measured by a method in accordance with JIS K 7311. The measurement conditions were a measurement temperature of 23° C., a humidity of 50% and a tensile speed of 100 mm/minute.

(15) A breaking energy was obtained by integrating a stress from an elongation of zero of an elongation-stress curve to an elongation at break.

Example 1

Preparation of Aqueous Polyurethane Resin Dispersion (1)

In a reaction vessel equipped with a stirrer, a reflux condenser and a thermo-meter were charged 2200 g of ETERNACOLL UH-200 (Registered trademark; poly-carbonate diol available from UBE INDUSTRIES, LTD.; number average molecular weight: 2000; hydroxyl value: 56.1 mg KOH/g; polycarbonate diol obtained by reacting 1,6-hexanediol and dimethyl carbonate), 147 g of 2,2-dimethylol propionic acid (DMPA) and 1420 g of N-methylpyrrolidone (NMP) under nitrogen stream. To the mixture were added 995 g of 4,4'-dicyclohexylmethane diisocyanate (hydrogen-added MDI) and 2.6 g of dibutyl tin dilaurate (catalyst), and the resulting mixture was heated to 90° C. and subjected to urethanization reaction for 5 hours. Thereafter, 74.4 g of methyl ethyl ketone oxime (MEKO) was injected into the mixture, and stirring was continued at the same temperature for 1.5 hours to obtain a polyurethane prepolymer. The free isocyanate group content at the time of termination of the urethanization reaction was 1.75% by weight. To the reaction mixture was added 111 g of triethyl-amine and mixed, and 4610 g of the resulting mixture was taken out and added to 7300 g of water under vigorous stirring. Then, 296 g of 35% by weight 2-methyl-1,5-pentanediamine aqueous solution was added thereto, and chain-elongation reaction was carried out to obtain an aqueous polyurethane resin dispersion. A content of urethane bondings, a content of urea bondings, a content of carbonate bondings, a weight average molecular weight, a content of the alicyclic structure and a content of the blocked isocyanate group (calculated on the isocyanate group) of the resulting aqueous poly-urethane resin dispersion (1) are shown in Table 1. A film-forming time, a maximum drying time of the coated film capable of redispersing in water and a result of the adhesiveness test to the electrodeposited surface of the aqueous polyurethane resin dispersion (1) are shown in Table 2.

[Preparation of Polyurethane Film (A)]

The aqueous polyurethane resin dispersion (1) was coated on a glass plate as a coating composition, and dried at 120° C. for 3 hours, and at 140° C. for 30 minutes to obtain a good coating layer. The obtained coating layer was peeled off to prepare a polyurethane film (A). A film thickness of the obtained polyurethane film (A) was 0.15 mm, and its solvent resistance, water resistance and tensile characteristics were shown in Table 2.

Example 2

Preparation of Aqueous Polyurethane Resin Dispersion (2)

In a similar reaction vessel used in Example 1 were charged 185 g of ETERNACOLL UH-200 (Registered trademark; polycarbonate diol available from UBE INDUSTRIES, LTD.; number average molecular weight: 2000; hydroxyl value: 56.1 mg KOH/g; polycarbonate diol obtained by reacting 1,6-hexanediol and dimethyl carbonate), 47.8 g of ETERNACOLL UC-100 (polycarbonate diol available from UBE INDUSTRIES, LTD.; number average molecular weight: 1000; hydroxyl value: 112.2 mg KOH/g; polycarbonate diol obtained by reacting 1,4-cyclohexanedimethanol and dimethyl carbonate), 24.0 g of 2,2-dimethylol propionic acid (DMPA) and 177 g of N-methylpyrrolidone (NMP) under nitrogen stream. To the mixture were added 155 g of 4,4'-dicyclohexylmethane diisocyanate (hydrogen-added MDI) and 0.3 g of dibutyltin dilaurate (catalyst), and the resulting mixture was heated to 90° C. and subjected to urethanization reaction for 5 hours. Thereafter, 12.8 g of methyl ethyl ketone oxime (MEKO) was injected into the mixture, and stirring was continued at the same temperature for 1.5 hours to obtain a polyurethane prepolymer. The free isocyanate group content at the time of termination of the urethanization reaction was 2.78% by weight. To the reaction mixture was added 18.1 g of triethylamine and mixed, and 620 g of the resulting mixture was taken out and added to 960 g of water under vigorous stirring. Then, 66.0 g of 35% by weight 2-methyl-1,5-pentanediamine aqueous solution was added to the mixture and chain-elongation reaction was carried out to obtain an aqueous polyurethane resin dispersion. A content of urethane bondings, a content of urea bondings, a content of carbonate bondings, a weight average molecular weight, a content of the alicyclic structure and a content of the blocked isocyanate group (calculated on the isocyanate group) of the resulting aqueous polyurethane resin dispersion (2) are shown in Table 1. A film-forming time, a maximum drying time of the coated film capable of redispersing in water and a result of the adhesiveness test to the electrodeposited surface of the aqueous polyurethane resin dispersion (2) are shown in Table 2.

[Preparation of Polyurethane Film (B)]

The aqueous polyurethane resin dispersion (2) was coated on a glass plate as a coating composition, and dried at 120° C. for 3 hours, and at 140° C. for 30 minutes to obtain a good coating layer. The obtained coating layer was peeled off to prepare a polyurethane film (B). A film thickness of the obtained polyurethane film (B) was 0.15 mm, and its solvent resistance, water resistance and tensile characteristics were shown in Table 2.

Example 3

Preparation of Aqueous Polyurethane Resin Dispersion (3)

In a similar reaction vessel used in Example 1 were charged 272 g of ETERNACOLL UH-200 (Registered trademark; polycarbonate diol available from UBE INDUSTRIES, LTD.; number average molecular weight: 2000; hydroxyl value: 56.1 mg KOH/g; polycarbonate diol obtained by reacting 1,6-hexanediol and dimethyl carbonate), 18.5 g of 2,2-dimethylol propionic acid (DMPA) and 176 g of N-methylpyrrolidone (NMP) under nitrogen stream. To the mixture were added 125 g of 4,4'-dicyclohexylmethane diisocyanate (hydrogen-added MDI) and 0.3 g of dibutyltin dilaurate (catalyst), and the resulting mixture was heated to 90° C. and subjected to urethanization reaction for 5 hours. Thereafter, 10.4 g of 3,5-dimethylpyrazole (DMPZ) was injected into the mixture, and stirring was continued at the same temperature for 1.5 hours to obtain a polyurethane prepolymer. The free isocyanate group content at the time of termination of the urethanization reaction was 1.78% by weight. To the reaction mixture was added 13.9 g of triethylamine and mixed, and 564 g of the resulting mixture was taken out and added to 870 g of water under vigorous stirring. Then, 36.5 g of 35% by weight 2-methyl-1,5-pentanediamine aqueous solution was added to the mixture and chain-elongation reaction was carried out to obtain an aqueous polyurethane resin dispersion. A content of urethane bondings, a content of urea bondings, a content of carbonate bondings, a weight average molecular weight, a content of the alicyclic structure and a content of the blocked isocyanate group (calculated on the isocyanate group) of the resulting aqueous polyurethane resin dispersion (3) are shown in Table 1. A film-forming time, a maximum drying time of the coated film capable of redispersing in water and a result of the adhesiveness test to the electro-deposited surface of the aqueous polyurethane resin dispersion (3) are shown in Table 2.

[Preparation of Polyurethane Film (C)]

The aqueous polyurethane resin dispersion (3) was coated on a glass plate as a coating composition, and dried at 120° C. for 3 hours, and at 140° C. for 30 minutes to obtain a good coating layer. The obtained coating layer was peeled off to prepare a polyurethane film (C). A film thickness of the obtained polyurethane film (C) was 0.15 mm, and its solvent resistance, water resistance and tensile characteristics were shown in Table 2.

Example 4

Preparation of Aqueous Polyurethane Resin Dispersion (4)

In a similar reaction vessel used in Example 1 were charged 939 g of 4,4'-dicyclohexylmethane diisocyanate (hydrogen-added MDI), 135 g of diethyl malonate (DEM), 664 g of N-methylpyrrolidone (NMP) and 1.38 g of 28% sodium methoxide-methanol solution (catalyst) under nitrogen stream, and stirred at 70° C. for 4 hours. To the mixture was added 1.57 g of dibutyl phosphate, the resulting mixture was stirred at the same temperature for 1 hour, and then, 2190 g of ETERNACOLL UH-200 (Registered trademark; polycarbonate diol available from UBE INDUSTRIES, LTD.; number average molecular weight: 2000; hydroxyl value: 56.1 mg KOH/g; poly-carbonate diol obtained by reacting 1,6-hexanediol and dimethyl carbonate), 146 g of 2,2-dimethylol propionic acid (DMPA), 47.9 g of hydrogen-added MDI and 2.8 g of dibutyltin dilaurate (catalyst) were charged. Thereafter, the mixture was stirred at 80° C. for 5 hours to obtain a polyurethane prepolymer. The free isocyanate group content at the time of termination of the urethanization reaction was 1.83% by weight. To the reaction mixture was added 109 g of triethylamine and mixed, and 4590 g of the resulting mixture was taken out and added to 7100 g of water under vigorous stirring. Then, 303 g of 35% by weight 2-methyl-1,5-pentanediamine aqueous solution was added to the mixture and chain-elongation reaction was carried out to obtain an aqueous polyurethane resin dispersion. A content of urethane bondings, a content of urea bondings, a content of carbonate bondings, a weight average molecular weight, a content of the alicyclic structure and a content of the blocked isocyanate group (calculated on the isocyanate group) of the resulting aqueous polyurethane resin dispersion (4) are shown in Table 1. A film-forming time, a maximum drying time of the coated film capable of redispersing in water and a result of the adhesiveness test to the electro-deposited surface of the aqueous polyurethane resin dispersion (4) are shown in Table 2.

[Preparation of Polyurethane Film (D)]

The aqueous polyurethane resin dispersion (4) was coated on a glass plate as a coating composition, and dried at 120° C. for 3 hours, and at 140° C. for 30 minutes to obtain a good coating layer. The obtained coating layer was peeled off to prepare a polyurethane film (D). A film thickness of the obtained polyurethane film (D) was 0.15 mm, and its solvent resistance, water resistance and tensile characteristics were shown in Table 2.

Example 5

Preparation of Aqueous Polyurethane Resin Dispersion (5)

In a similar reaction vessel used in Example 1 were charged 261 g of ETERNACOLL UH-200 (Registered trademark; polycarbonate diol available from UBE INDUSTRIES, LTD.; number average molecular weight: 2000; hydroxyl value: 56.1 mg KOH/g; polycarbonate diol obtained by reacting 1,6-hexanediol and dimethyl carbonate), 17.6 g of 2,2-dimethylol propionic acid (DMPA) and 171 g of N-methyl-pyrrolidone (NMP) under nitrogen stream. To the mixture were added 117 g of 4,4'-dicyclohexylmethane diisocyanate (hydrogen-added MDI) and 0.3 g of dibutyltin dilaurate (catalyst), and the resulting mixture was heated to 90° C. and subjected to urethanization reaction for 5 hours. Thereafter, 2.84 g of methyl ethyl ketone oxime (MEKO) was injected into the mixture, and stirring was continued at the same temperature for 1.5 hours to obtain a polyurethane prepolymer. The free isocyanate group content at the time of termination of the urethanization reaction was 2.23% by weight. To the reaction mixture was added 13.3 g of triethylamine and mixed, and 521 g of the resulting mixture was taken out and added to 860 g of water under vigorous stirring. Then, 43.0 g of 35% by weight 2-methyl-1,5-pentanediamine aqueous solution was added to the mixture and chain-elongation reaction was carried out to obtain an aqueous polyurethane resin dispersion. A content of urethane bondings, a content of urea bondings, a content of carbonate bondings, a weight average molecular weight, a content of the alicyclic structure and a content of the blocked isocyanate group (calculated on the isocyanate group) of the resulting aqueous polyurethane resin dispersion (5) are shown in Table 1. A film-forming time, a maximum drying time of the coated film capable of redispersing in water and a result of the adhesiveness test to the electrodeposited surface of the aqueous polyurethane resin dispersion (5) are shown in Table 2.

[Preparation of Polyurethane Film (E)]

The aqueous polyurethane resin dispersion (5) was coated on a glass plate as a coating composition, and dried at 120° C. for 3 hours, and at 140° C. for 30 minutes to obtain a good coating layer. The obtained coating layer was peeled off to prepare a polyurethane film (E). A film thickness of the obtained polyurethane film (E) was 0.15 mm, and its solvent resistance, water resistance and tensile characteristics were shown in Table 2.

Comparative Example 1

Preparation of Aqueous Polyurethane Resin Dispersion (6)

In a similar reaction vessel used in Example 1 were charged 261 g of ETERNACOLL UH-200 (Registered trademark; polycarbonate diol available from UBE INDUSTRIES, LTD.; number average molecular weight: 2000; hydroxyl value: 56.1 mg KOH/g; polycarbonate diol obtained by reacting 1,6-hexanediol and dimethyl carbonate), 17.5 g of 2,2-dimethylol propionic acid (DMPA) and 166 g of N-methyl-pyrrolidone (NMP) under nitrogen stream. To the mixture were added 115 g of 4,4'-dicyclohexylmethane diisocyanate (hydrogen-added MDI) and 0.3 g of dibutyltin dilaurate (catalyst), and the resulting mixture was heated to 90° C. and stirring was continued for 5 hours to obtain a polyurethane prepolymer. The free isocyanate group content at the time of termination of the urethanization reaction was 2.50% by weight. To the reaction mixture was added 13.3 g of triethylamine and mixed, and 512 g of the resulting mixture was taken out and added to 850 g of water under vigorous stirring. Then, 48.0 g of 35% by weight 2-methyl-1,5-pentanediamine aqueous solution was added to the mixture and chain-elongation reaction was carried out to obtain an aqueous polyurethane resin dispersion. A content of urethane bondings, a content of urea bondings, a content of carbonate bondings, a weight average molecular weight, a content of the alicyclic structure and a content of the blocked isocyanate group (calculated on the isocyanate group) of the resulting aqueous polyurethane resin dispersion (6) are shown in Table 1. A film-forming time, a maximum drying time of the coated film capable of redispersing in water and a result of the adhesiveness test to the electrodeposited surface of the aqueous polyurethane resin dispersion (6) are shown in Table 2.

[Preparation of Polyurethane Film (F)]

The aqueous polyurethane resin dispersion (6) was coated on a glass plate as a coating composition, and dried at 120° C. for 3 hours, and at 140° C. for 30 minutes to obtain a good coating layer. The obtained coating layer was peeled off to prepare a polyurethane film (F). A film thickness of the obtained polyurethane film (F) was 0.15 mm, and its solvent resistance, water resistance and tensile characteristics were shown in Table 2.

Comparative Example 2

Preparation of Aqueous Polyurethane Resin Dispersion (7)

In a similar reaction vessel used in Example 1 were charged 261 g of ETERNACOLL UH-200 (Registered trademark; polycarbonate diol available from UBE INDUSTRIES, LTD.; number average molecular weight: 2000; hydroxyl value: 56.1 mg KOH/g; polycarbonate diol obtained by reacting 1,6-hexanediol and dimethyl carbonate), 17.5 g of 2,2-dimethylol propionic acid (DMPA) and 166 g of N-methylpyrrolidone (NMP) under nitrogen stream. To the mixture were added 115 g of 4,4'-dicyclohexylmethane diisocyanate (hydrogen-added MDI) and 0.3 g of dibutyltin dilaurate (catalyst), and the resulting mixture was heated to 90° C. and stirring was continued for 5 hours to obtain a polyurethane prepolymer. The free isocyanate group content at the time of termination of the urethanization reaction was 2.50% by weight. To the reaction mixture was added 13.3 g of triethylamine and mixed, and 512 g of the resulting mixture was taken out and added to 850 g of water under vigorous stirring. Then, 33.6 g of 35% by weight 2-methyl-1,5-pentanediamine aqueous solution was added to the mixture and chain-elongation reaction was carried out, and 22.3 g of 35% by weight butylamine aqueous solution was added to the same to carry out sealing reaction at the molecular ends to obtain an aqueous polyurethane resin dispersion. A content of urethane bondings, a content of urea bondings, a content of carbonate bondings, a weight average molecular weight, a content of the alicyclic structure and a content of the blocked isocyanate group (calculated on the isocyanate group) of the resulting aqueous polyurethane resin dispersion (7) are shown in Table 1. A film-forming time, a maximum drying time of the coated film capable of redispersing in water and a result of the adhesiveness test to the electrodeposited surface of the aqueous polyurethane resin dispersion (7) are shown in Table 2.

[Preparation of Polyurethane Film (G)]

The aqueous polyurethane resin dispersion (7) was coated on a glass plate as a coating composition, and dried at 120° C. for 3 hours, and at 140° C. for 30 minutes to obtain a good coating layer. The obtained coating layer was peeled off to prepare a polyurethane film (G). A film thickness of the obtained polyurethane film (G) was 0.15 mm, and its solvent resistance, water resistance and tensile characteristics were shown in Table 2.

Comparative Example 3

Preparation of Aqueous Polyurethane Resin Dispersion (8)

In a similar reaction vessel used in Example 1 were charged 99.8 g of ETERNACOLL UH-200 (Registered trademark; polycarbonate diol available from UBE INDUSTRIES, LTD.; number average molecular weight: 2000; hydroxyl value: 56.1 mg KOH/g; polycarbonate diol obtained by reacting 1,6-hexanediol and dimethyl carbonate), 42.7 g of ETERNACOLL UC-100 (polycarbonate diol available from UBE INDUSTRIES, LTD.; number average molecular weight: 1000; hydroxyl value: 112.2 mg KOH/g; polycarbonate diol obtained by reacting 1,4-cyclohexanedimethanol and dimethyl carbonate), 16.1 g of neopentylglycol (NPG), 27.4 g of 2,2-dimethylol propionic acid (DMPA) and 165 g of N-methylpyrrolidone (NMP) under nitrogen stream. To the mixture were added 199 g of 4,4'-dicyclohexylmethane diisocyanate (hydrogen-added MDI) and 0.3 g of dibutyltin dilaurate (catalyst), and the resulting mixture was heated to 90° C. and subjected to urethanization reaction for 5 hours. Thereafter, 4.57 g of methyl ethyl ketone oxime (MEKO) was injected into the mixture, and stirring was continued at the same temperature for 1.5 hours to obtain a poly-urethane prepolymer. The free isocyanate group content at the time of termination of the urethanization reaction was 4.13% by weight. To the reaction mixture was added 20.7 g of triethylamine and mixed, and 496 g of the resulting mixture was taken out and added to 790 g of water under vigorous stirring. Then, 74.4 g of 35% by weight 2-methyl-1,5-pentanediamine aqueous solution was added to the mixture and chain-elongation reaction was carried out to obtain an aqueous polyurethane resin dispersion. A content of urethane bondings, a content of urea bondings, a content of carbonate bondings, a weight average molecular weight, a content of the alicyclic structure and a content of the blocked isocyanate group (calculated on the isocyanate group) of the resulting aqueous polyurethane resin dispersion (8) are shown in Table 1. A film-forming time, a maximum drying time of the coated film capable of redispersing in water and a result of the adhesiveness test to the electrodeposited surface of the aqueous polyurethane resin dispersion (8) are shown in Table 2.

[Preparation of Polyurethane Film (H)]

The aqueous polyurethane resin dispersion (8) was coated on a glass plate as a coating composition, and dried at 120° C. for 3 hours, and at 140° C. for 30 minutes to obtain a good coating layer. The obtained coating layer was peeled off to prepare a polyurethane film (H). A film thickness of the obtained polyurethane film (H) was 0.15 mm, and its solvent resistance, water resistance and tensile characteristics were shown in Table 2.

Comparative Example 4

Preparation of Aqueous Polyurethane Resin Dispersion (9)

In a similar reaction vessel used in Example 1 were charged 142 g of ETERNACOLL UM90 (1/3) (Registered trademark; polycarbonate diol available from UBE INDUSTRIES, LTD.; number average molecular weight: 900; hydroxyl value: 124.7 mg KOH/g; polycarbonate diol obtained by reacting a mixture of 1,4-cyclo-hexanedimethanol and 1,6-hexanediol (1:3 in molar ratio) with dimethyl carbonate), 5.89 g of neopentylglycol (NPG), 28.9 g of 2,2-dimethylol propionic acid (DMPA) and 159 g of N-methylpyrrolidone (NMP) under nitrogen stream. To the mixture were added 189 g of 4,4'-dicyclohexylmethane diisocyanate (hydrogen-added MDI) and 0.3 g of dibutyltin dilaurate (catalyst), and the resulting mixture was heated to 90° C. and subjected to urethanization reaction for 5 hours. Thereafter, 47.5 g of methyl ethyl ketone oxime (MEKO) was injected into the mixture, and stirring was continued at the same temperature for 1.5 hours to obtain a polyurethane prepolymer. The free isocyanate group content at the time of termination of the urethanization reaction was 0.0% by weight. To the reaction mixture was added 21.7 g of triethylamine and mixed, and 537 g of the resulting mixture was taken out and added to 900 g of water under vigorous stirring to obtain an aqueous polyurethane resin dispersion. A content of urethane bondings, a content of urea bondings, a content of carbonate bondings, a weight average molecular weight, a content of the alicyclic structure and a content of the blocked isocyanate group (calculated on the isocyanate group) of the resulting aqueous polyurethane resin dispersion (9) are shown in Table 1. A film-forming time, a maximum drying time of the coated film capable of redispersing in water and a result of the adhesiveness test to the electrodeposited surface of the aqueous polyurethane resin dispersion (9) are shown in Table 2.

[Preparation of Polyurethane Film (I)]

The aqueous polyurethane resin dispersion (9) was coated on a glass plate as a coating composition, and dried at 120° C. for 3 hours, and at 140° C. for 30 minutes to obtain a good coating layer. The obtained coating layer was peeled off to prepare a polyurethane film (I). A film thickness of the obtained polyurethane film (I) was 0.15 mm, and its solvent resistance, water resistance and tensile characteristics were shown in Table 2. However, the obtained polyurethane film (I) had extremely low elongation at break, so that test piece could not be prepared whereby tensile characteristics could not be measured.

Even when a blocking agent was used, if a sum of the contents of the urethane bondings and the urea bondings were too much, it could be found out that a film-forming time became short (see Comparative example 3). Also, it could be found out that by lowering a sum of the contents of the

TABLE 1

| | Component (b) | Component (d) | Urethane bondings content [% by weight] | Urea bondings content [% by weight] | Sum of urethane bondings content and urea bondings content [% by weight] | Carbonate bondings content [% by weight] | Weight average molecular weight Mw | Alicyclic structure content [% by weight] | Blocked NCO content [% by weight] | Acid value [mg KOH/g] |
|---|---|---|---|---|---|---|---|---|---|---|
| Example 1 | UH-200 | MEKO | 7.4 | 3.1 | 10.5 | 25.2 | 30,000 | 17.5 | 1.1 | 17.5 |
| Example 2 | UH-200/ UC-100 | MEKO | 8.3 | 5.1 | 13.4 | 20.2 | 30,000 | 22.4 | 1.4 | 22.1 |
| Example 3 | UH-200 | DMPZ | 7.6 | 3.2 | 10.8 | 25.2 | 30,000 | 17.5 | 1.1 | 17.5 |
| Example 4 | UH-200 | DEM | 7.3 | 3.1 | 10.4 | 25.0 | 30,000 | 17.3 | 1.0 | 17.4 |
| Example 5 | UH-200 | MEKO | 7.2 | 4.2 | 11.3 | 23.8 | 60,000 | 16.8 | 0.3 | 17.0 |
| Comparative example 1 | UH-200 | — | 7.1 | 4.5 | 11.6 | 23.6 | 280,000 | 16.7 | 0.0 | 16.9 |
| Comparative example 2 | UH-200 | — | 7.3 | 4.4 | 11.7 | 24.2 | 30,000 | 16.7 | 0.0 | 17.3 |
| Comparative example 3 | UH-200/ UC-100/ NPG | MEKO | 13.0 | 7.2 | 20.1 | 12.6 | 60,000 | 34.8 | 0.5 | 26.6 |
| Comparative example 4 | UM90(1/3)/ NPG | MEKO | 13.6 | 0.0 | 13.6 | 13.1 | 4,000 | 29.3 | 6.1 | 32.5 |

TABLE 2

| | Maximum drying time of the coated film capable of redispersing in water [min] | Film-forming time [hr] | Solvent resistance (toluene) | Water resistance | Adhesive-ness to electro-deposited surface | Tensile characteristics | | | |
|---|---|---|---|---|---|---|---|---|---|
| | | | | | | Modulus of elasticity [MPa] | Tensile strength [MPa] | Elongation at break [%] | Breakage energy [N · m] |
| Example 1 | >90 | >12 | ○ | ○ | 25/25 | 30 | 50 | 260 | 1.4 |
| Example 2 | >90 | >12 | ○ | ○ | 25/25 | 240 | 38 | 240 | 1.7 |
| Example 3 | >90 | >12 | ○ | ○ | 25/25 | 22 | 61 | 430 | 2.2 |
| Example 4 | >90 | >12 | ○ | ○ | 25/25 | 23 | 29 | 280 | 1.2 |
| Example 5 | 30 | 8.0 | ○ | ○ | 25/25 | 30 | 52 | 300 | 1.7 |
| Comparative example 1 | >15 | 3.5 | ○ | ○ | 15/25 | 30 | 65 | 400 | 3.0 |
| Comparative example 2 | >90 | >12 | X | X | 9/25 | 20 | 10 | 230 | 0.5 |
| Comparative example 3 | 15 | 2.5 | ○ | ○ | 25/25 | 600 | 82 | 230 | 3.1 |
| Comparative example 4 | >90 | >12 | ○ | ○ | 25/25 | — | — | — | — |

As shown in Table 2, the aqueous polyurethane resin dispersions of the present invention are each controlled in film-forming speed after coating, and the coated film was easily redispersed in water. Moreover, the coated films obtained by coating and heat treatment were excellent in water resistance and solvent resistance, and adhesive-ness to the electrodeposition film. Also, tensile characteristics were generally good.

On the other hand, when no blocking agent was used, if Mw of the poly-urethane resin was small, it could be found out that a film-forming time could be elongated, but adhesiveness to the electrodeposited coating surface was poor, and water resistance or solvent resistance became worse (see Comparative example 2). When Mw of the polyurethane resin was increased to improve water resistance or solvent resistance, it could be found out that a film-forming time became short, whereby adhesiveness to the electrodeposited coating surface could not be so improved (see Comparative example 1).

urethane bondings and the urea bondings, a film-forming time could be elongated, but tensile strength became too weak so that preparation of a test piece could not be carried out (see Comparative example 4).

In Examples 1 to 5, a film-forming time which was a problem to be solved could be elongated, and solvent resistance or water resistance were excellent, and adhesiveness to the electrodeposited coating surface, and tensile characteristics were also sufficient.

UTILIZABILITY IN INDUSTRY

In the aqueous polyurethane resin dispersion of the present invention, after coating on a substrate material, repaint or removal of an extra coating film can be easily carried out so that its utility and convenience are high. Also, the coating film obtained by the aqueous polyurethane resin dispersion of the present invention is excellent in water resistance, solvent resistance and adhesiveness to the electrodeposition film, and can be widely utilized as a material for a film, paint and coating, etc.

The invention claimed is:

1. An aqueous polyurethane resin dispersion which comprises a polyurethane resin obtained by reacting (A) a polyurethane prepolymer which is obtained by reacting (a) an alicyclic diisocyanate compound, (b) a polycarbonate polyol containing an aliphatic diol or alicyclic diol unit and having a number average molecular weight of 400 to 3000, (c) an acidic group-containing polyol compound, and (d) a blocking agent for an isocyanate group, which dissociates at 80 to 180° C., and (B) a chain elongating agent which has reactivity with the isocyanate group, being dispersed in an aqueous medium, a sum of a content of urethane bondings and a content of urea bondings is 7 to 18% by weight in terms of solid components, a content of carbonate bondings is 18 to 35% by weight in terms of solid components, and a content of an isocyanate group to which the above-mentioned blocking agent has bonded is 0.2 to 3% by weight in terms of solid components and calculated on the isocyanate group, wherein (a) the alicyclic diisocyanate compound is at least one selected from the group consisting of isophorone diisocyanate and 4,4'-dicyclohexylmethane diisocyanate, (c) the acidic group-containing polyol compound is at least one selected from the group consisting of 2,2-dimethylol propionic acid and 2,2-dimethylol butanoic acid.

2. The aqueous polyurethane resin dispersion according to claim 1, wherein the polyurethane resin has a weight average molecular weight of 10,000 to 80,000.

3. The aqueous polyurethane resin dispersion according to claim 1, wherein an acid value is 10 to 40 mg KOH/g in terms of solid components.

4. The aqueous polyurethane resin dispersion according to claim 1, wherein the polyurethane resin contains an alicyclic structure, and a content of the alicyclic structure is 10 to 40% by weight in terms of solid components.

5. The aqueous polyurethane resin dispersion according to claim 1, wherein (d) the blocking agent is at least one selected from the group consisting of an oxime series compound, a pyrazole series compound and a malonic acid diester series compound.

6. A process for preparing the aqueous polyurethane resin dispersion according to claim 1, which comprises a step of reacting (a) an alicyclic diisocyanate compound, (b) a polycarbonate polyol containing an aliphatic diol or alicyclic diol unit and having a number average molecular weight of 400 to 3000, (c) an acidic group-containing polyol compound and (d) a blocking agent to obtain a polyurethane prepolymer, a step of neutralizing an acidic group in the polyurethane prepolymer, a step of dispersing the polyurethane prepolymer in an aqueous medium, and a step of reacting (B) a chain elongating agent with the polyurethane prepolymer.

7. A coating composition which contains the aqueous polyurethane resin dispersion according to claim 1.

8. A polyurethane resin film obtained by coating, heating and drying a composition containing the aqueous polyurethane resin dispersion according to claim 1 on a surface of a substrate material.

9. The aqueous polyurethane resin dispersion according to claim 2, wherein an acid value is 10 to 40 mg KOH/g in terms of solid components.

10. The aqueous polyurethane resin dispersion according to claim 2, wherein the polyurethane resin contains an alicyclic structure, and a content of the alicyclic structure is 10 to 40% by weight in terms of solid components.

11. The aqueous polyurethane resin dispersion according to claim 2, wherein (d) the blocking agent is at least one selected from the group consisting of an oxime series compound, a pyrazole series compound and a malonic acid diester series compound.

12. A process for preparing the aqueous polyurethane resin dispersion according to claim 2, which comprises a step of reacting (a) an alicyclic diisocyanate compound, (b) a polycarbonate polyol containing an aliphatic diol or alicyclic diol unit and having a number average molecular weight of 400 to 3000, (c) an acidic group-containing polyol compound and (d) a blocking agent to obtain a polyurethane prepolymer, a step of neutralizing an acidic group in the polyurethane prepolymer, a step of dispersing the polyurethane prepolymer in an aqueous medium, and a step of reacting (B) a chain elongating agent with the polyurethane prepolymer.

13. A coating composition which contains the aqueous polyurethane resin dispersion according to claim 2.

14. A polyurethane resin film obtained by coating, heating and drying a composition containing the aqueous polyurethane resin dispersion according to claim 2 on a surface of a substrate material.

15. The aqueous polyurethane resin dispersion according to claim 1, wherein the sum of the content of urethane bondings and the content of urea bondings is 8 to 15% by weight.

* * * * *